United States Patent
Jeon

(10) Patent No.: US 12,423,911 B2
(45) Date of Patent: Sep. 23, 2025

(54) METHOD, SYSTEM, AND NON-TRANSITORY COMPUTER-READABLE RECORDING MEDIUM FOR DETERMINING VIRTUAL SPACE CONTENT ON THE BASIS OF ATTRIBUTE INFORMATION

(71) Applicant: ANIPEN INC., Seongnam-si (KR)

(72) Inventor: Jae Woong Jeon, Seoul (KR)

(73) Assignee: ANIPEN INC., Seongnam-si (KR)

( * ) Notice: Subject to any disclaimer, the term of this patent is extended or adjusted under 35 U.S.C. 154(b) by 182 days.

(21) Appl. No.: 18/567,419

(22) PCT Filed: Jun. 7, 2022

(86) PCT No.: PCT/KR2022/008039
§ 371 (c)(1),
(2) Date: Dec. 6, 2023

(87) PCT Pub. No.: WO2022/260414
PCT Pub. Date: Dec. 15, 2022

(65) Prior Publication Data
US 2024/0273821 A1    Aug. 15, 2024

(30) Foreign Application Priority Data
Jun. 7, 2021 (KR) .................. 10-2021-0073526

(51) Int. Cl.
*G06T 17/00* (2006.01)
(52) U.S. Cl.
CPC .................. *G06T 17/00* (2013.01)

(58) Field of Classification Search
CPC ......... G06T 17/00; G06T 19/20; G06F 3/011; G06F 16/9035; G06N 3/08; G06Q 50/10
See application file for complete search history.

(56) References Cited

U.S. PATENT DOCUMENTS

| | | | | |
|---|---|---|---|---|
| 2009/0164917 A1* | 6/2009 | Kelly | ...................... | G06F 3/011 715/757 |
| 2011/0161838 A1* | 6/2011 | Kang | ...................... | G06Q 50/01 709/204 |
| 2014/0236775 A1* | 8/2014 | Gill | ..................... | G06Q 30/0643 705/27.2 |
| 2019/0130792 A1* | 5/2019 | Rios | ...................... | G09B 23/285 |

FOREIGN PATENT DOCUMENTS

| | | | | |
|---|---|---|---|---|
| JP | 2020112889 A | | 7/2020 | |
| KR | 1020130068593 A | | 6/2013 | |
| KR | 20150112423 A | * | 10/2015 | ............. G06Q 50/22 |
| KR | 1020210023435 A | | 3/2021 | |
| KR | 1020210060265 A | | 5/2021 | |
| KR | 102258899 B1 | | 6/2021 | |

* cited by examiner

Primary Examiner — Maurice L. McDowell, Jr.
(74) Attorney, Agent, or Firm — Dinsmore & Shohl LLP; Yongsok Choi, Esq.

(57) ABSTRACT

A method for providing a content is provided. The method includes the steps of: determining attribute information on an object associated with a virtual space, with reference to a user's genetic information; and determining a virtual space content to be provided to the user, on the basis of the attribute information.

13 Claims, 2 Drawing Sheets

320  310

420  410

METHOD, SYSTEM, AND NON-TRANSITORY COMPUTER-READABLE RECORDING MEDIUM FOR DETERMINING VIRTUAL SPACE CONTENT ON THE BASIS OF ATTRIBUTE INFORMATION

CROSS-REFERENCE TO RELATED APPLICATION(S)

This application is a national phase of Patent Cooperation Treaty (PCT) International Application No. PCT/KR2022/008039 filed on Jun. 7, 2022, which claims priority to Korean Patent Application No. 10-2021-0073526 filed on Jun. 7, 2021. The entire contents of PCT International Application No. PCT/KR2022/008039 and Korean Patent Application No. 10-2021-0073526 are hereby incorporated by reference.

FIELD OF THE INVENTION

The present invention relates to a method, system, and non-transitory computer-readable recording medium for providing a content.

BACKGROUND

Recent advances in computer graphics and communication technologies have led to the development of virtual reality (VR), augmented reality (AR), mixed reality (MR), and extended reality (XR) technologies. Here, the virtual reality technology refers to a technology that creates a virtual space not existing in the real world and then makes the virtual space feel real; the augmented reality technology refers to a technology that superimposes computer-generated information on top of the real world; the mixed reality technology refers to a technology that mixes actual reality, augmented reality, and virtual reality elements and enhances user interactions; and the extended reality technology refers to a technology that encompasses augmented reality, virtual reality, and mixed reality. Microsoft's HoloLens is known as a device for providing contents using the extended reality or mixed reality technology.

Further, a metaverse is a typical virtual space that provides users with augmented reality, mixed reality, or extended reality. The term "metaverse" is a compound of "meta" meaning fictional or abstract and "universe" meaning the real world, and refers to a three-dimensional virtual world. The metaverse is an advancement over a traditional virtual reality environment, and provides a virtual shared space that combines the reality and the virtuality.

However, in the past, the same virtual space content (e.g., metaverse content) was provided to all users without distinction, or only superficial content recommendations or variations were made within the virtual space content on the basis of simple demographic information like genders, ages, and the like of the users, which was not enough to meet the needs of the users or provide personalized experiences.

In this connection, the inventor (s) present a novel and inventive technique capable of providing a user with a hyper-personalized virtual space content on the basis of the user's genetic information.

SUMMARY OF THE INVENTION

One object of the present invention is to solve all the above-described problems in the prior art.

Another object of the invention is to provide a hyper-personalized virtual space content.

Yet another object of the invention is to provide a hyper-personalized user experience by changing a virtual space content in real time or dynamically according to the user's actions.

The representative configurations of the invention to achieve the above objects are described below.

According to one aspect of the invention, there is provided a method for providing a content, the method comprising the steps of: determining attribute information on an object associated with a virtual space, with reference to a user's genetic information; and determining a virtual space content to be provided to the user, on the basis of the attribute information.

According to another aspect of the invention, there is provided a system for providing a content, the system comprising: an attribute information determination unit configured to determine attribute information on an object associated with a virtual space, with reference to a user's genetic information; and a virtual space content determination unit configured to determine a virtual space content to be provided to the user, on the basis of the attribute information.

In addition, there are further provided other methods and systems to implement the invention, as well as non-transitory computer-readable recording media having stored thereon computer programs for executing the methods.

According to the invention, it is possible to provide a hyper-personalized virtual space content.

According to the invention, it is possible to provide a hyper-personalized user experience by changing a virtual space content in real time or dynamically according to the user's actions.

DETAILED DESCRIPTION OF THE INVENTION

Figure 1:
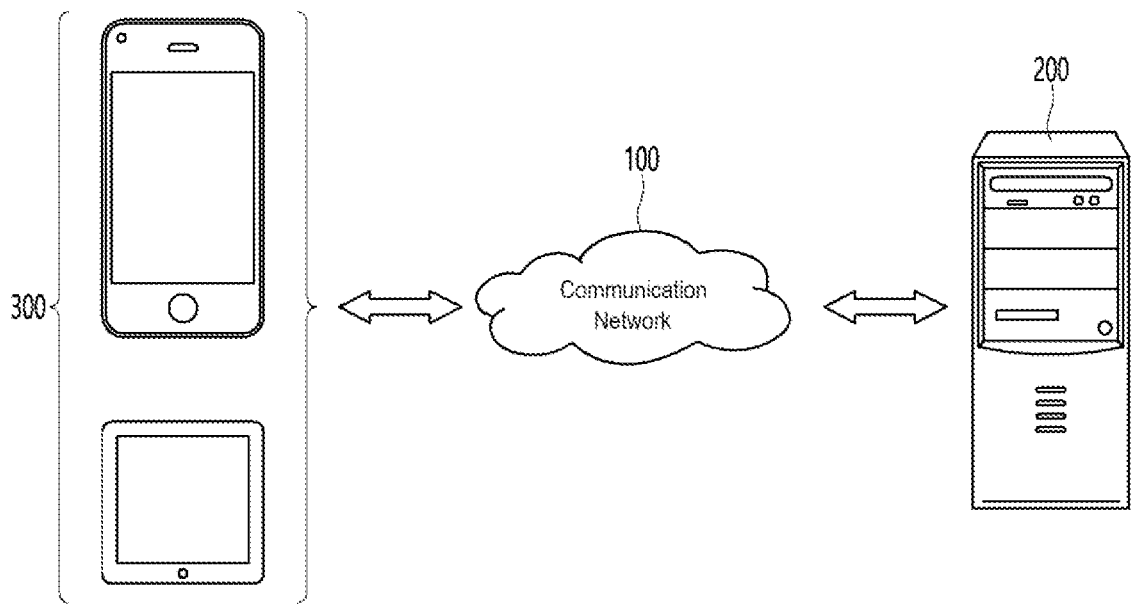
FIG. 1 schematically shows the configuration of an entire system for providing a content according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Herein, the term "content" or "contents" encompasses digital information or individual information elements comprised of text, symbol, speech, sound, image, video, point cloud, polygons, and the like, which are accessible via communication networks. For example, such contents may comprise data such as text, image, video, audio, links (e.g., web links), point could, and polygons, or a combination of at least two types of such data.

Hereinafter, various preferred embodiments of the present invention will be described in detail with reference to the accompanying drawings to enable those skilled in the art to easily implement the invention.

Configuration of the Entire System

FIG. 1 schematically shows the configuration of the entire system for providing a content according to one embodiment of the invention.

As shown in FIG. 1, the entire system according to one embodiment of the invention may comprise a communication network 100, a content provision system 200, and a user device 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as radio frequency (RF) communication, WiFi communication, cellular communication (e.g., Long Term Evolution (LTE) communication), Bluetooth communication (more specifically, Bluetooth Low Energy (BLE) communication), infrared communication, and ultrasonic communication.

Next, the content provision system 200 according to one embodiment of the invention may be a digital device having a memory means and a microprocessor for computing capabilities. For example, the content provision system 200 may be a server system.

The content provision system 200 according to one embodiment of the invention may function to determine attribute information on an object associated with a virtual space, with reference to a user's genetic information, and determine a virtual space content to be provided to the user, on the basis of the attribute information. Here, the virtual space content according to one embodiment of the invention may include an augmented reality content, a virtual reality content, a mixed reality content, an extended reality content, or a combination thereof. For example, the virtual space content may include a metaverse content.

The configuration and functions of the content provision system 200 according to the invention will be discussed in more detail below. Meanwhile, the above description is illustrative although the content provision system 200 has been described as above, and it will be apparent to those skilled in the art that at least a part of the functions or components required for the content provision system 200 may be implemented or included in the user device 300 to be described below or an external system shown), as necessary.

Next, the user device 300 according to one embodiment of the invention is digital equipment that may function to connect to and then communicate with the content provision system 200 via the communication network 100, and any type of digital equipment having a memory means and a microprocessor for computing capabilities, such as a smart phone, a tablet PC, smart glasses, and a smart helmet, may be adopted as the user device 300 according to the invention.

Meanwhile, the user device 300 according to one embodiment of the invention may include an application for supporting the content provision functions according to the invention. The application may be downloaded from the content provision system 200 or an external application distribution server (not shown).

Configuration of the Content Provision System

Hereinafter, the internal configuration of the content provision system 200 crucial for implementing the invention and the functions of the respective components thereof will be discussed.

Figure 2:
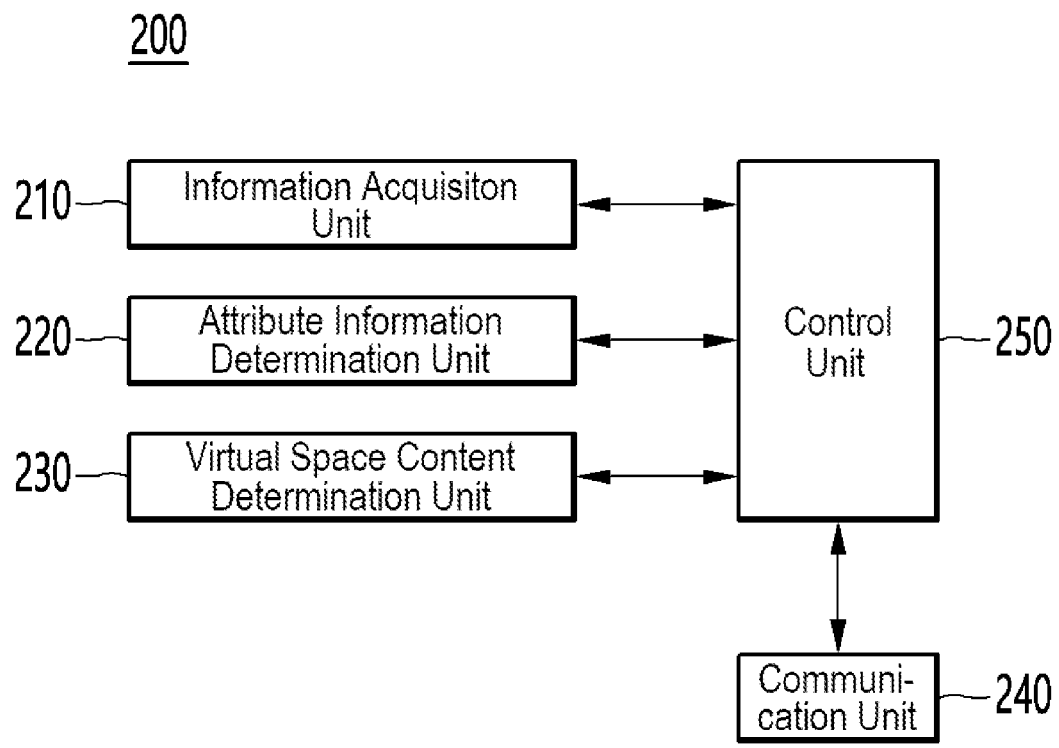
FIG. 2 specifically shows the internal configuration of a content provision system according to one embodiment of the invention.

FIG. 2 specifically shows the internal configuration of the content provision system 200 according to one embodiment of the invention.

As shown in FIG. 2, the content provision system 200 according to one embodiment of the invention may comprise an information acquisition unit 210, an attribute information determination unit 220, a virtual space content determination unit 230, a communication unit 240, and a control unit 250. According to one embodiment of the invention, at least some of the information acquisition unit 210, the attribute information determination unit 220, the virtual space content determination unit 230, the communication unit 240, and the control unit 250 may be program modules that communicate with an external system. The program modules may be included in the content provision system 200 in the form of operating systems, application program modules, and other program modules, while they may be physically stored in a variety of commonly known storage devices. Further, the program modules may also be stored in a remote storage device that may communicate with the content provision system 200. Meanwhile, such program modules may include, but are not limited to, routines, subroutines, programs, objects, components, and data structures for performing specific tasks or executing specific abstract data types according to the invention as will be described below.

First, the information acquisition unit 210 according to one embodiment of the invention may function to acquire information on a user who is to be provided with a content (specifically, a virtual space content).

For example, the information acquisition unit 210 may acquire genetic information of the user (i.e., information on the user) with reference to the user's genetic test result information acquired from the user device 300 or a server associated with the user (not shown) (e.g., a server where the user's genetic test result information is stored). The genetic test result information according to one embodiment of the invention may include information on results of tests by polymerase chain reaction DNA sequencing, (PCR), chromosomal microarray (CMA), karyotyping, fluorescence in situ hybridization (FISH), direct-to-consumer (DTC), and the like. Further, the genetic information according to one embodiment of the invention may include first analysis information such as a sequence and a single nucleotide polymorphism (SNP), and second analysis information such as health information (e.g., by time of life or by age), body type information (e.g., by time of life or by age), personality information (e.g., by time of life or by age), and taste information (e.g., by time of life or by age) estimated on the basis of the first analysis information.

As another example, the information acquisition unit 210 may acquire profile information of the user with reference to information entered by the user, information recorded on the user device 300 (e.g., a smart phone), text message information, e-mail information, social network service (SNS) information, medical information (e.g., electronic medical record (EMR)), and the like. For example, the profile information according to one embodiment of the invention may include demographic information such as a gender, age, region, and race, health information such as blood pressure, body fat, blood glucose, stress, and obesity, and interest information such as taste, hobby, and disposition.

Meanwhile, it is noted that the information on the user according to the invention is not necessarily limited to those listed above (i.e., the genetic information and profile information), and the information on the user according to the invention may include any information that may be used for hyper-personalization of the user as long as the objects of the invention may be achieved.

Next, the attribute information determination unit 220 according to one embodiment of the invention may function to determine attribute information on an object associated with a virtual space, with reference to the information on the user acquired by the information acquisition unit 210. The virtual space according to one embodiment of the invention may refer to an augmented reality space, a virtual reality space, a mixed reality space, an extended reality space, or a combination thereof, and may be, for example, a metaverse space. The attribute information on the object associated with the virtual space according to one embodiment of the invention may include information on types, shapes, a number, placement, manners of interaction (e.g., communication) of objects included in the virtual space. For example, the objects to be included in the virtual space may be determined or preset in correspondence to the user's profile information or genetic information (e.g., with reference to a lookup table for objects corresponding to the profile information or genetic information), and may include buildings, roads, flora, fauna, products, clerks, doctors, consultants, and the like. For example, the attribute information on the object associated with the virtual space may include information on locations, sizes, a number, and shapes (or structures) of buildings to be placed in the virtual space (e.g., metaverse space); locations, sizes, a number, shapes, and types of commercial spaces (e.g., stores or department stores) to be placed in the buildings; locations, sizes, a number, shapes, and types of products to be placed in the commercial spaces; and locations, a number, dispositions, and manners of communication (e.g., text or audio) of clerks to be placed in the commercial spaces.

For example, the attribute information determination unit 220 may estimate information on the user's health status (e.g., information on age-specific health status) with reference to at least one of the user's genetic information (e.g., single nucleotide polymorphism (SNP) information associated with health) and profile information. Then, with reference to the information on the health status, the attribute information determination unit 220 may determine the attribute information on the object as causing an object for a virtual consultant (or clerk), which provides audio descriptions of the efficacy or effectiveness of foods, medicines, or products (e.g., medical products or insurance products) for improving the user's health status or preparing for age-specific health issues (e.g., diseases or illnesses), and introduces, sells, or consults about the foods, medicines, or products), to be placed around the user in a virtual space for a digital healthcare store, and causing foods, medicines, or products associated with improving the user's health status to be placed close to the user in the virtual space, while causing foods, medicines, or products not associated with improving the user's health status (e.g., not good for the user's health status or not associated with improving the user's health status) to be placed far from the user or not placed in the virtual space. Here, the virtual consultant's (or virtual clerk's) conversation, explanation, or interaction with the user may be facilitated by performing learning such as deep learning or reinforcement learning using conversations, explanations, or interactions performed with a plurality of users as training data. Further, the attribute information determination unit 220 may determine a strength of recommendation of the object with reference to the user's genetic information and information on the space (or place) where the object is to be placed (e.g., the types of products sold in the space where the object is to be placed, or the purpose of the space where the object is to be placed), and may determine where (or whether) the object is to be placed (specifically, with respect to the user) in the virtual space with reference to the strength of recommendation. For example, if the strength of recommendation of a first object is higher (or greater) than the strength of recommendation of a second object with respect to a particular user, the attribute information on the object may be determined such that the distance between the first object and the user is smaller than the distance between the second object and the user (i.e., the first object is placed closer to the user than the second object). More specifically, if the space where the object is to be placed is a digital healthcare store space, the strength of recommendation may be determined on the basis of whether and how much the user's health status is improved (e.g., a health food that improves the user's health status may be determined to have a high strength of recommendation for the user, and a health food that is not good for the user's health status may be determined to have a low strength of recommendation for the user). Meanwhile, it is noted that the strength of recommendation according to the invention is not necessarily determined only with reference to the user's genetic information, and may also be determined with reference to the user's profile information and the like as long as the objects of the invention may be achieved.

As another example, with reference to at least one of the user's genetic information (e.g., SNP information associated with personality and taste) and profile information, the attribute information determination unit 220 may determine the attribute information on the object as causing an object for a virtual clerk, which provides text descriptions of the latest and popular products of each clothing brand and assists in selling the products, to be placed in a virtual space for a department store that sells a plurality of clothing brands, and causing products of clothing brands for which recommendation strengths are high with respect to the user (or the user's interests specified on the basis of the user's profile information are high) (e.g., clothing brands that are frequently used by a plurality of users who coincide with the user at or above a predetermined level with respect to SNP information associated with disposition or taste) to be placed close to the user in the virtual space, while causing products of clothing brands for which recommendation strengths are low with respect to the user (or the user's interests specified on the basis of the user's profile information are low) (e.g., clothing brands that are frequently used by a plurality of users who coincide with the user at or below a predetermined level with respect to SNP information associated with disposition or taste) to be placed far from the user or not placed at all in the virtual space.

As another example, the attribute information determination unit 220 may estimate information on the user's body type with reference to at least one of the user's genetic information (e.g., SNP information associated with body types) and profile information. Then, with reference to the information on the body type, the attribute information determination unit 220 may determine the attribute information on the object as causing an object for a virtual clerk, which provides audio or text descriptions of clothing or accessories and assists in selling the clothing or accessories, to be placed in a virtual space for a store that sells clothing or accessories, and causing clothing or accessories that match the user's body type to be placed close to the user in the virtual space, while causing clothing or accessories that do not match the user's body type to be placed far from the user or not placed at all in the virtual space.

As another example, the attribute information determination unit 220 may estimate information on the user's age-specific health status (or disease issues) with reference to at least one of the user's genetic information (e.g., SNP information associated with health) and profile information. Then, with reference to the information on the age-specific health status, the attribute information determination unit 220 may determine the attribute information on the object as causing an object for a virtual doctor, which provides consultation on the basis of information on a result of analyzing the user's current or future health status (or disease issues), to be placed around the user in a virtual space for a hospital where the user may receive medical treatment or consultation about the health status (or disease issues). Meanwhile, the virtual doctor's consultation or interaction with the user may be facilitated by performing learning such as deep learning or reinforcement learning (e.g., learning about medical knowledge, diagnoses, prescriptions, or conversations) using consultations or interactions performed with a plurality of users as training data.

Although the embodiments related to a single space have been mainly described above, it is noted that the virtual space according to the invention does not necessarily consist of only one space, and may consist of two or more spaces as long as the objects of the invention may be achieved.

For example, with reference to at least one of the user's genetic information (e.g., SNP information associated with health) and profile information (e.g., a woman in her 20s who loves animals), the attribute information determination unit 220 may determine the attribute information on the object as causing a hospital building shaped like a palm tree (i.e., the user's preferred plant) and a department store building shaped like a tiger (i.e., the user's preferred animal) to be placed side by side in front of the user in a virtual space for a city including the hospital and the department store, and (1) causing an object for a virtual doctor, which provides consultation on the basis of information on a result of analyzing the user's current or future health status (or disease issues), to be placed in the hospital building, and (2) causing an object for a virtual clerk, which provides text descriptions of the latest and popular products of each clothing brand and assists in selling the products, to be placed in the department store building, and causing products of clothing brands for which recommendation strengths are high with respect to the user to be placed close to the user in the department store building, while causing products of clothing brands for which recommendation strengths are low with respect to the user to be placed far from the user or not placed at all in the department store building.

Further, the attribute information determination unit 220 may determine the attribute information on the object associated with the virtual space with further reference to a result of analyzing participation history information acquired from at least one virtual space content associated with the user. According to one embodiment of the invention, the participation history information may include information on all of the user's actions and conversations that occur while being provided with the virtual space content, and may include, for example, interactions (e.g., conversations or questions and answers with an artificial intelligence (AI) chatbot), paths traveled, and gaze changes that occur in the virtual space content.

For example, the attribute information determination unit 220 may analyze the user's participation history information acquired from at least one virtual space content in which the user has participated to extract the user's preferred attribute information (e.g., preferred types and appearances of objects (e.g., buildings or clerks) and preferred manners of interaction with the objects), and may determine the attribute information on the object associated with the virtual space with reference to the extracted preferred attribute information (e.g., by giving the preferred attribute information a higher priority).

Next, the virtual space content determination unit 230 according to one embodiment of the invention may determine a virtual space content to be provided to the user, on the basis of the attribute information determined by the attribute information determination unit 220 (i.e., the attribute information on the object associated with the virtual space).

For example, the virtual space content determination unit 230 may determine the virtual space content to be provided to the user as a content generated by creating a virtual space associated with the user (e.g., a virtual space that is requested or likely to be requested by the user) and placing objects in the virtual space on the basis of the attribute information on the object associated with the virtual space.

More specifically, the virtual space content determination unit 230 may create a virtual space for a healthcare store that provides introductions, sales, or consultations about foods, medicines, or products (e.g., medical products or insurance products) for improving the user's health status or preparing for age-specific health issues (e.g., diseases or illnesses), with reference to the user's profile information (e.g., the user has a purchase need for health foods, medicines, or products). Then, with reference to the attribute information on the object associated with the virtual space, the virtual space content determination unit 230 may determine the virtual space content to be provided to the user by causing an object for a virtual consultant (e.g., which may be partially similar to a traditional non-player character (NPC), and may be trained to converse or interact with the user on the basis of an artificial intelligence technique), which provides audio descriptions of the efficacy or effectiveness of the foods, medicines, or products, and introduces, sells, or consults about the foods, medicines, or products, to be placed around the user in the virtual space for the healthcare store, and causing foods, medicines, or products associated with improving the user's health status to be placed close to the user in the virtual space, while causing foods, medicines, or products not associated with improving the user's health status (e.g., not good for the user's health status or not associated with improving the user's health status) to be placed far from the user or not placed in the virtual space. That is, a content for a digital healthcare space hyper-personalized for the user may be determined as the virtual space content to be provided to the user.

Further, at the user's request, the virtual space content determination unit 230 may create a virtual space for a department store that sells a plurality of clothing brands. Then, with reference to the attribute information on the object associated with the virtual space, the virtual space content determination unit 230 may determine the virtual space content to be provided to the user by causing an object for a virtual clerk, which provides text descriptions of the latest and popular products of each clothing brand and assists in selling the products, to be placed in the virtual space for the department store, and causing products of clothing brands for which recommendation strengths are high with respect to the user (or the user's interests specified on the basis of the user's profile information are high) (e.g., clothing brands that are frequently used by a plurality of users who coincide with the user at or above a predetermined level with respect to SNP information associated with disposition or taste) to be placed close to the user in the virtual space, while causing products of clothing brands for which recommendation strengths are low with respect to the user (or the user's interests specified on the basis of the user's profile information are low) (e.g., clothing brands that are frequently used by a plurality of users who coincide with the user at or below a predetermined level with respect to SNP information associated with disposition or taste) to be placed far from the user or not placed at all in the virtual space. That is, a content for a department store (or a store) hyper-personalized for the user may be determined as the virtual space content to be provided to the user.

Furthermore, the virtual space content determination unit 230 may create a virtual space for a store that sells clothing or accessories, with reference to the user's profile information (e.g., the user has a purchase need for clothing or accessories). Then, with reference to the attribute information on the object associated with the virtual space, the virtual space content determination unit 230 may determine the virtual space content to be provided to the user by causing an object for a virtual clerk, which provides audio or text descriptions of clothing or accessories and assists in selling the clothing or accessories, to be placed in the space for the store, and causing clothing or virtual accessories that match the user's body type to be placed close to the user in the virtual space, while causing clothing or accessories that do not match the user's body type to be placed far from the user or not placed at all in the virtual space. That is, a content for a store hyper-personalized for the user may be determined as the virtual space content to be provided to the user.

In addition, at the user's request, the virtual space content determination unit 230 may create a virtual space for a hospital where the user may receive medical treatment or consultation about the health status (or disease issues). Then, with reference to the attribute information on the object associated with the virtual space, the virtual space content determination unit 230 may determine the virtual space content to be provided to the user by causing an object for a virtual doctor, which provides consultation on the basis of information on a result of analyzing the user's current or future health status (or disease issues), to be placed in the virtual space for the hospital. That is, a content for a hospital hyper-personalized for the user may be determined as the virtual space content to be provided to the user.

Next, the communication unit 240 according to one embodiment of the invention may function to enable data transmission/reception from/to the information acquisition unit 210, the attribute information determination unit 220, and the virtual space content determination unit 230.

Lastly, the control unit 250 according to one embodiment of the invention may function to control data flow among the information acquisition unit 210, the attribute information determination unit 220, the virtual space content determination unit 230, and the communication unit 240. That is, the control unit 250 according to one embodiment of the invention may control data flow into/out of the content provision system 200 or data flow among the respective components of the content provision system 200, such that the information acquisition unit 210, the attribute information determination unit 220, the virtual space content determination unit 230, and the communication unit 240 may carry out their particular functions, respectively.

Hereinafter, a situation in which a content is provided to a user according to one embodiment of the invention will be described in detail with reference to FIGS. 3 and 4.

Figure 3:
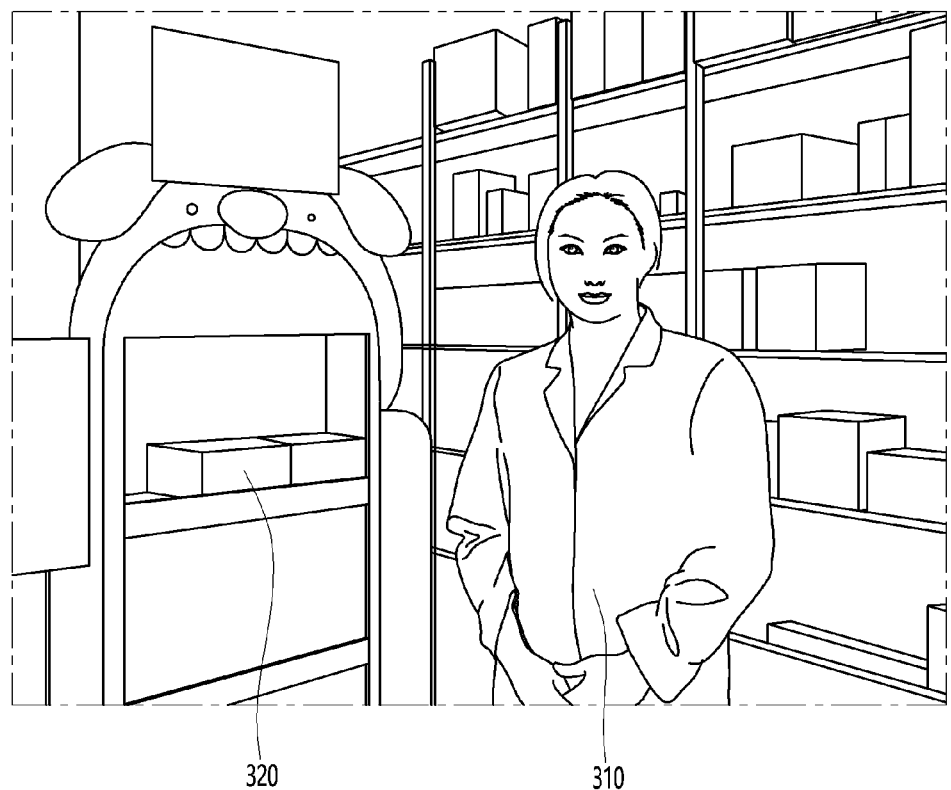
FIGS. 3 and 4 illustratively show a situation in which a virtual space content is provided to a user according to one embodiment of the invention.
Figure 4:
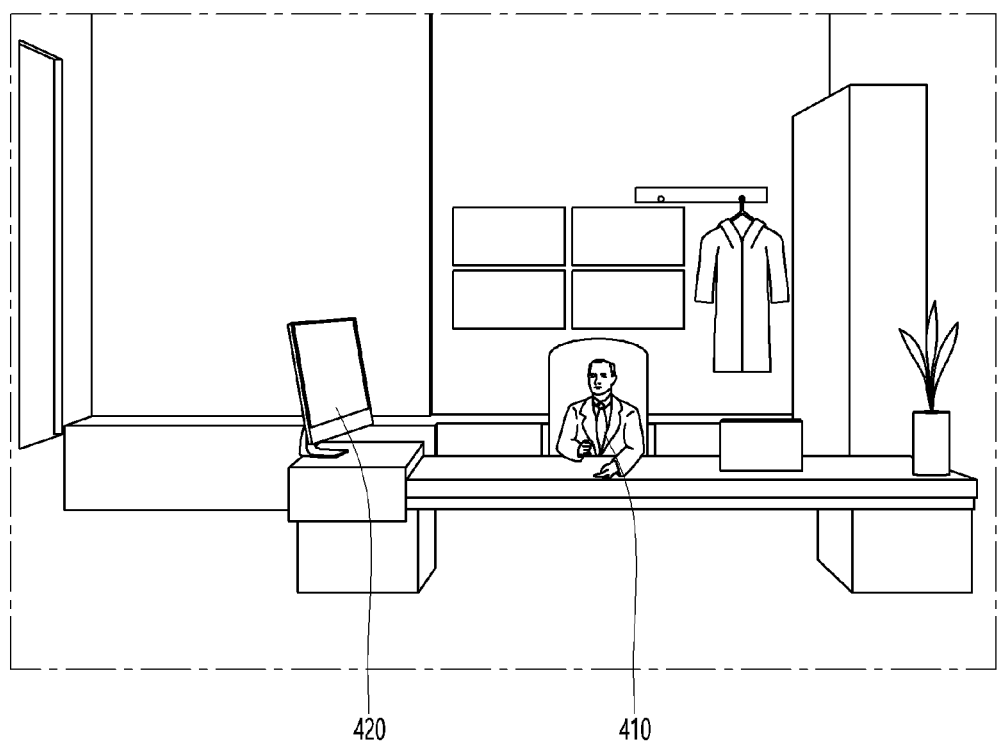

FIGS. 3 and 4 illustratively show a situation in which a virtual space content is provided to a user according to one embodiment of the invention.

First Embodiment

Referring to FIG. 3, a situation may be assumed in which a virtual space content for a health food store is provided to a user who uses a metaverse space according to one embodiment of the invention.

First, the content provision system 200 according to one embodiment of the invention may acquire the user's genetic information from the user device 300. For example, the genetic information may include information on at least one single nucleotide polymorphism of the user.

Then, according to one embodiment of the invention, age-specific health information of the user may be estimated on the basis of the information on the at least one single nucleotide polymorphism of the user.

Then, according to one embodiment of the invention, attribute information on an object associated with the health food store space (e.g., a virtual consultant for health food guidance and sales, or a health food) may be determined.

Then, according to one embodiment of the invention, with reference to the attribute information, the content provision system 200 may determine a virtual space content to be provided to the user by causing an object for a virtual consultant 310, which provides audio descriptions of the efficacy or effectiveness of health foods, and introduces, sells, or consults about the health foods, to be placed in front of the user in the virtual space for the health food store, and causing a health food 320 for improving the user's health status to be placed in a display case close to the user in the virtual space.

Meanwhile, the placement of the health foods may be determined with further reference to the user's profile information. For example, a health food estimated to be of interest to the user may be determined from among health foods for improving the user's health status, with reference to the user's profile information, and the determined health food may be placed preferentially (or relatively closer to the user than the other health foods) in the display case.

Then, according to one embodiment of the invention, the virtual space content for the health food store may be added to the metaverse space that is used by (or being used by) the user, and the content may be provided to the user at the user's request.

That is, according to one embodiment of the invention, a content for a health food store hyper-personalized for each user may be provided. For example, the types and placement of health foods in the health food store when a first user uses the virtual space content may differ from the types and placement of health foods in the health food store when a second user uses the virtual space content.

Although it has been mainly described above that a hyper-personalized virtual space content is determined on the basis of information on the user (e.g., product and building placement, building structure, metaverse world, and the like are changed according to the user), the virtual space content may be dynamically determined (or redetermined) in response to an action that the user who is provided with the virtual space content takes with respect to the virtual space.

For example, according to one embodiment of the invention, the content provision system 200 (specifically, the attribute information determination unit 220 and the virtual space content determination unit 230) may redetermine (or update) the attribute information on the object (i.e., the attribute information on the object associated with the virtual space) in real time or periodically, with reference to an action taken by the user with respect to the virtual space content (e.g., moving around the virtual space, viewing product information, or interacting with a virtual clerk or other users), and may dynamically modify the virtual space content provided to the user (e.g., rearrange the products in the store), or add another virtual space content to the virtual space content, on the basis of the attribute information on the object.

More specifically, when the user is provided with a virtual space content for a store including a product display stand where products are arranged in order of the user's interest, and a virtual clerk which may assist the user in purchasing the products and interact with the user, and the user performs an interaction to view a product of interest on the product display stand (e.g., touches the product), products associated with the product with which the interaction is performed (i.e., similar products) may be rearranged around the user (e.g., within a predetermined distance from the user) or around the product with which the interaction is performed. In this case, the products may be rearranged in a predetermined order of priority, which is specified with reference to the above-described information on the user (e.g., genetic information and profile information). It is noted that the rearrangement is not necessarily performed only for the objects as described above, and the virtual space (e.g., place and time) itself may also be rearranged (or modified).

Meanwhile, in order to determine the attribute information on the object associated with the virtual space with reference to the user's genetic information, the content provision system 200 according to the invention may refer to a lookup table or database (not shown) for a plurality of pieces of attribute information (i.e., attribute information on objects associated with the virtual space) corresponding to a plurality of pieces of genetic information, and the lookup table or database may be updated dynamically or periodically. Further, information on (e.g., types or a number of) the objects associated with the virtual space or attribute information on the objects may be determined from a list purchased (e.g., purchased in a predetermined platform) by the user.

Second Embodiment

Referring to FIG. 4, a situation may be assumed in which a virtual space content for a hospital is provided to a user who uses a metaverse space according to one embodiment of the invention.

First, the content provision system 200 according to one embodiment of the invention may acquire information on the user from the user device 300. For example, the user's profile information (e.g., gender and age) and genetic information (e.g., information on at least one single nucleotide polymorphism) may be acquired as the information on the user.

Then, according to one embodiment of the invention, life cycle-specific health information of the user may be estimated on the basis of the user's gender and age and the information on the at least one single nucleotide polymorphism.

Then, according to one embodiment of the invention, with reference to the information on the life cycle-specific health status (or disease issues), the attribute information on the object may be determined as causing an object for a male doctor 410, which provides consultation on the basis of information on a result of analyzing the user's current or future health status (or disease issues), to be placed in front of the user at a predetermined size in a hospital space where the user may receive medical treatment or consultation about the health status (or disease issues).

Then, according to one embodiment of the invention, the content provision system 200 may determine a virtual space content to be provided to the user by creating a virtual space for the hospital (specifically, creating a building of a predetermined shape and size at a predetermined location in the virtual space, and creating a hospital space on a predetermined floor of the building), and causing the object for the virtual doctor 410, which provides consultation on the basis of the information on the result of analyzing the user's current or future health status (or disease issues), to be placed around the user in the virtual space, with reference to the attribute information on the object.

Then, according to one embodiment of the invention, the virtual space content for the hospital may be added to the metaverse space used by the user, and the content may be provided to the user at the user's request.

For example, when the user enters the floor that includes the hospital space in the building in the metaverse space, the virtual space content for the hospital may be provided in which analysis information 420 on the user's current or predicted disease or health issues is displayed, and the object for the virtual doctor 410 provides the analysis results and questions and answers in view of the displayed information 420.

Third Embodiment

Another situation may be assumed in which a virtual space content is provided to a user who uses a metaverse space according to one embodiment of the invention.

First, the content provision system 200 according to one embodiment of the invention may acquire information on the user. For example, the content provision system 200 may acquire the user's profile information (e.g., gender, age, body size, and religion), the user's genetic information (e.g., information on at least one single nucleotide polymorphism), and the user's participation history information acquired from at least one virtual space content associated with the user (e.g., interactions (e.g., conversations or questions and answers with an artificial intelligence (AI) chatbot), paths traveled, and gaze changes that occur in the virtual space content).

Then, according to one embodiment of the invention, the content provision system 200 (specifically, the attribute information determination unit 220) may determine the attribute information corresponding to the user, with reference to a result of performing learning for determining attribute information (i.e., an environment and a place of the virtual space, and a number, sizes, placement, kinds, and types of objects) corresponding to a plurality of users on the basis of training data including at least one of profile information and participation history information of the plurality of users (e.g., performing supervised learning on the basis of attribute information labeled to the profile information or participation history information of the plurality of users) (e.g., a result of inputting the user's profile information and participation history information into a learning model for which the learning is performed) and the user's genetic information. According to one embodiment of the invention, the learning may be performed on the basis of an algorithm based on an artificial neural network or deep learning, such as a reinforcement neural network, a convolutional neural network, a recurrent neural network, a deep Q-network, a deep feedforward network, and a generative adversarial network. However, the learning method according to the invention is not necessarily limited to those listed above, and may be diversely applied as long as the objects of the invention may be achieved.

Then, according to one embodiment of the invention, a virtual space content to be provided to the user may be determined on the basis of the attribute information.

According to the invention, unlike a conventional technique that merely superficially recommends some contents in a virtual space (e.g., a metaverse space), it is possible to provide a more sophisticated hyper-personalized virtual space content by dynamically configuring placement, structure, environment, and the like of the virtual space in consideration of the user's congenital or acquired health status, disposition, personality, taste, needs, and the like.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for providing a content, the method comprising the steps of:
   determining, by a processor, attribute information on an object associated with a virtual space, with reference to a user's genetic information; and
   determining, by the processor a virtual space content to be provided to the user, on the basis of the attribute information.

2. The method of claim 1, wherein the attribute information on the object includes information on a location where the object is to be placed in the virtual space.

3. The method of claim 1, wherein in the step of determining the attribute information, strengths of recommendation of a plurality of objects are determined with reference to the user's genetic information and information on a space where the plurality of objects are to be placed, and locations where the plurality of objects are to be placed in the virtual space are determined with reference to the strengths of recommendation.

4. The method of claim 1, wherein in the step of determining the attribute information, the attribute information on the object is determined with further reference to a result of analyzing the user's participation history information, and
   wherein the participation history information is acquired from at least one virtual space content associated with the user.

5. The method of claim 4, wherein in the step of determining the attribute information, the attribute information on the object is determined with further reference to a result of performing learning on the basis of profile information and participation history information of a plurality of users.

6. The method of claim 1, wherein in the step of determining the virtual space content, the virtual space content to be provided to the user is dynamically determined in response to an action that the user who is provided with the virtual space content takes with respect to the virtual space content.

7. A non-transitory computer-readable recording medium having stored thereon a computer program for executing the method of claim 1.

8. A system for providing a content, the system comprising:
   a processor programmed to:
   determine attribute information on an object associated with a virtual space, with reference to a user's genetic information; and
   determine a virtual space content to be provided to the user, on the basis of the attribute information.

9. The system of claim 8, wherein the attribute information on the object includes information on a location where the object is to be placed in the virtual space.

10. The system of claim 8, wherein the processor is programmed to determine strengths of recommendation of a plurality of objects with reference to the user's genetic information and information on a space where the plurality of objects are to be placed, and determine locations where the plurality of objects are to be placed in the virtual space with reference to the strengths of recommendation.

11. The system of claim 8, wherein the processor is programmed to determine the attribute information on the object with further reference to a result of analyzing the user's participation history information, and
   wherein the participation history information is acquired from at least one virtual space content associated with the user.

12. The system of claim 11, wherein the processor is programmed to determine the attribute information on the object with further reference to a result of performing learning on the basis of profile information and participation history information of a plurality of users.

13. The system of claim 8, wherein the processor is programmed to dynamically determine the virtual space content to be provided to the user, in response to an action that the user who is provided with the virtual space content takes with respect to the virtual space content.

* * * * *